March 27, 1962 Z. J. GRABICKI ETAL 3,027,344
HIGH TENSILE STRENGTH SILICONE RUBBER COMPOSITIONS AND METHOD
Filed Sept. 24, 1958

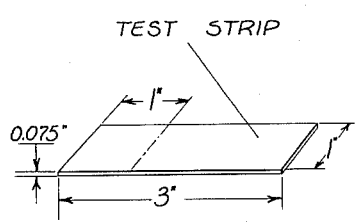

Fig.1.

TEST STRIP

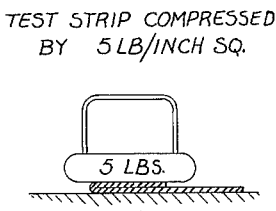

Fig.2.

TEST STRIP COMPRESSED
BY 5 LB/INCH SQ.

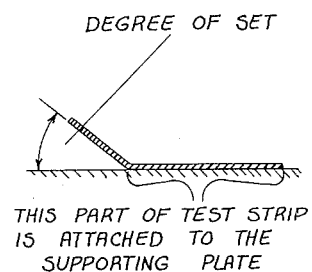

Fig.3.

DEGREE OF SET

THIS PART OF TEST STRIP
IS ATTACHED TO THE
SUPPORTING PLATE

Fig.4.

5 SECONDS AFTER RELASE OF WEIGHT

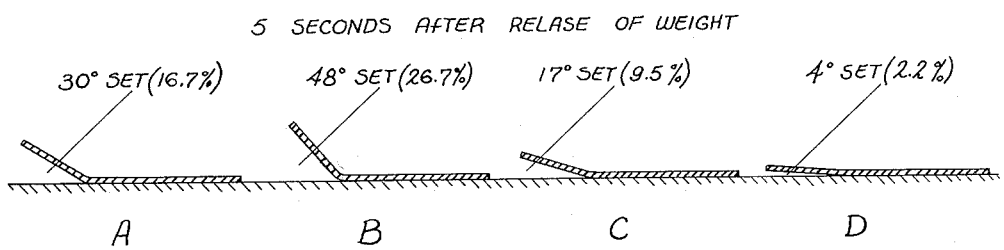

30° SET (16.7%)    48° SET (26.7%)    17° SET (9.5%)    4° SET (2.2%)

10 MINUTES AFTER RELEASE OF WEIGHT

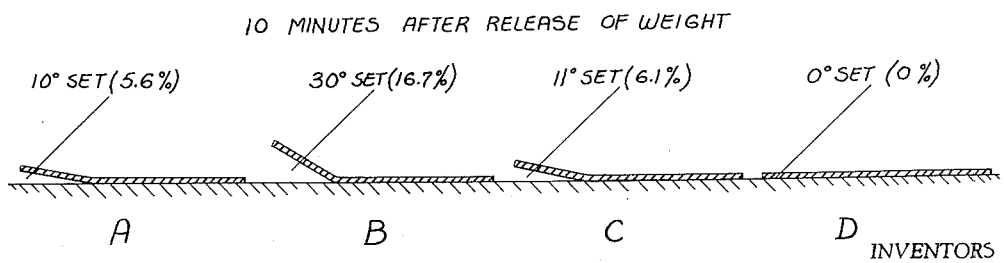

10° SET (5.6%)    30° SET (16.7%)    11° SET (6.1%)    0° SET (0%)

A        B        C        D

INVENTORS
Zbigniew J. Grabicki, and
John H. Baldrige
BY Rockwood & Bartholow
ATTORNEYS

United States Patent Office 3,027,344
Patented Mar. 27, 1962

3,027,344
HIGH TENSILE STRENGTH SILICONE RUBBER COMPOSITIONS AND METHOD
Zbigniew J. Grabicki and John H. Baldrige, East Haven, Conn., assignors to The Connecticut Hard Rubber Company, New Haven, Conn., a corporation of Connecticut
Filed Sept. 24, 1958, Ser. No. 763,076
10 Claims. (Cl. 260—37)

This invention relates to organopolysiloxane rubber compositions. More particularly, the invention relates to organopolysiloxane compositions having improved physical characteristics, and comprises a novel method for compounding such compositions.

The commercially available organopolysiloxane or silicone rubbers are reinforced and strengthened by the incorporation of various forms of amorphous and treated silicas. Vulcanizates of such mixtures obtained with the usual peroxide vulcanizing agents have reasonably good tensile strength, elasticity and tear resistance, and these properties are not substantially changed or altered at extremely high and low temperatures. These desirable properties have rendered these improved silicone rubber polymers particularly suitable for specialized uses, particularly in the aircraft industry.

Amorphous silica, which, unless water has been removed and excluded, is essentially silicon dioxide having its surface covered with silanol (—SiOH) groups, is well known both in the form of powders and of porous masses such as silica gel. The theory has been advanced that the silica particles are covered with siloxane linkages to which molecules of water are strongly adhered, but in general silica substrates are regarded as being covered with reactive hydroxyl groups. The esterification of these hydroxyl groups to produce finely divided hydrophobic silica is described by the Iler U.S. Patent 2,657,149, and the "estersils" produced by this process form organopolysiloxane vulcanizates having greatly improved tensile strength, heat stability and aging properties. Although many of the physical properties of such vulcanizates are improved by specially treated amorphous silicas, other properties remain essentially inferior to similar properties possessed by the cured natural rubbers. For example, the best known commercially available high strength silicone rubbers are characterized by high tension set and high bend set. Tension set is a measure of the residual extension which remains after a sample of cured rubber has been stretched, released and allowed to recover to its original dimensions. The rate at which the deformed sample tends to resume its initial dimension is an important factor, particularly with respect to the sealing or cushioning effect of the rubber in commercial application. The bend set of a cured rubber specimen is its ability to rapidly return to its original position after a strip of the material is bent through an arc of 180° and then released. The rapid recovery and low bend set of vulcanized specimens is an indication of an ideal condition of elasticity, rendering products formed of such rubber particularly useful as seals for air frame doors and canopies in aircraft application. There is no problem in the achievement of flow tension and bend set characteristics in relatively low tensile strength silicone rubber. There is a problem, however, in realizing these characteristics in high strength siloxanes which are required for commercial application. A particular object of the present invention is to provide cured organopolysiloxane rubber products which have superior tension and bend-set characteristics to the commercially available high strength silicone rubber products, while retaining the desirable characteristics of high tensile strength, low hardness and age resistance. A further object is to provide vulcanized organopolysiloxane rubber products having remarkable tension and bend-set characteristics without sacrificing other inherent physical properties possessed by the best commercially available silicone rubber products.

It has also been difficult to achieve a desirable degree of heat stability in the commercially available high tensile high tear strength silicone rubber vulcanizates. Another important object of the invention is to provide a novel method which results in superior heat stability without sacrifice of tensile strength.

Our products are characterized by tensile and tear strength which equals or excels the best commercially available silicone rubber. These beneficial characteristics are, moreover, realized without sacrifice of high elongation and low hardness.

In many specialized applications low hardness vulcanizates are desirable and demanded. Prior methods of producing such vulcanizates have required either very low filler content or the use of specially prepared silicone fluid polymers (see, for example, U.S. Patent No. 2,819,236). Even with the use of special compounding procedures and polymers, it has been impossible to obtain high tensile strength, low hardness vulcanizates. Reference to Example 3 hereinbelow will show that by our method we are able to prepare low hardness silicone rubber vulcanizates having exceptionally high tensile and tear strength.

Such products are further characterized by a high degree of heat stability and low bend set.

It has been found that a combination of ingredients and methods of treatment in the compounding procedure, constituting a departure from normal compounding procedure, impart a remarkably and unexpected improvement to the physical characteristics of the final product. The procedure discovered to result in these remarkable improvements according to the invention involves a preheating stage wherein the ingredients including the organopolysiloxane gum and silica filler first are thoroughly mixed in the presence of a soluble organic amine and a hydroxy organosilane. The cold premixing of the ingredients followed by the preheating treatment is in the absence of the customary peroxide curing agent since the curing agent would be inactivated by the amine or the hydroxy organosilane additive. Following this procedure, the composition is thoroughly remilled with the incorporation of the ordinary curing agent or agents, and the resulting mixture press cured or extruded and oven cured in accordance with conventional practice.

The above-described procedure requires the use of less peroxide curing agent, thereby decreasing the cost of the operation, and the vulcanizates contain less acidic residue, resulting in superior aging properties at elevated temperatures. It is believed that the preheating stage in the presence of the indicated reagents results in inactivating the hydroxyl or silanol groupings on the silica substrate, which apparently interfere with the curing process. However, we do not wish to be restricted to this theoretical conception of what occurs as the result of our discovery.

In accordance with a preferred embodiment of the invention, the organopolysiloxane gum is mixed with 5 to 100 parts by weight of silica filler, and from about 0.5 to 20 parts of the amine and hydroxy organosilane. In the case of the amine, the preferred proportion is from about 1 to 15 parts of amine to each 100 parts of the organopolysiloxane rubber gum.

These ingredients are thoroughly premixed with or without the addition of other common additives and in the absence of curing agents, and the resulting mixture subjected to a preheating treatment at a temperature of from 100° to 600° F. for a period of from instantaneous exposure (say for about 1 minute) at the higher temperatures, to 96 hours or more at the lower temperatures.

Preferably the temperature is within the range of about 250° to 500° F. for a time period of from 5 minutes to 10 hours. The time period required for a beneficial effect depends on the time required to bring the temperature of the material to within the indicated temperature ranges. A relatively short period of exposure in some cases results in a substantial improvement in physical properties.

After the pretreatment, under the prescribed conditions, the composition is vigorously remilled and the desired curing agent or agents incorporated into the mixture, whereupon the batch is cured by conventional procedures, including press cure, hot oil or steam vulcanization and the like at a temperature of between 180° and 600° F. for a period of 1 minute to about 24 hours. The customary press cure of the composition is at a temperature of from about 200° to 340° F. for a time period of about 5 minutes.

Whereas conventionally press-cured organopolysiloxane compositions require a further oven cure for stabilization of optimum physical properties, the press-cured product of the present invention is in many cases satisfactory from the standpoint of tensile strength, tear resistance, elasticity and hardness, without further processing.

The process of the invention is not restricted to the use of any soluble organic amine, and it has been found that soluble alkyl amines such as the primary, secondary and tertiary methyl, ethyl, butyl, propyl, and amyl amines are suitable, as well as mixed alkyl amines such as methylpropyl amines, primary, secondary and tertiary polyamines, including ethylene diamine, hydrazine, propylene diamine, diethylene tetramine, and the aromatic amines such as aniline or dimethyl aniline, pyridine, alkanol amines, and others.

The silicas amenable to the procedure of the invention include solid siliceous materials such as amorphous silica. They can be water-insoluble metal silicates or water-insoluble metal silicates coated with amorphous silica. Apparently the invention and improvements resulting therefrom are restricted to silica substrates having surface silanol groups which are inorganic. The procedure is not amenable to esterified silicas such as the estersils described in the Iler Patent 2,657,149.

The process is likewise applicable to other finely divided reinforcing type fillers such as aluminum oxide, iron oxide, titanium dioxide and zinc oxide. Similar to the silicas, such fillers have free reactive hydroxyl groups which tend to interfere with cross linkage incident to vulcanization.

The types of organo-substituted polysiloxanes useful in our invention are commonly called dialkyl or alkyl-aryl polysiloxane gums. The substituted groups are usually at least 50 percent in number methyl groups. The remainder of the groups are usually methyl or methyl with 5 to 20 percent phenyl or methyl with phenyl and vinyl, or methyl, vinyl or cyanopropyl groups, methyl vinyl and ethyl groups, or methyl and trifluoropropyl groups. We define our polysiloxane rubber as an organo-substituted polysiloxane of the empirical formula

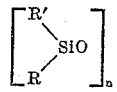

where R and R' are selected from the class consisting of the methyl and ethyl groups, the halogen and nitrile substituted alkyl groups containing from 1 to 4 carbon atoms, phenyl, halogenated phenyl, vinyl and cyclohexenyl groups and $n$ is a large number. R and R' may, if desired, be predominately or entirely methyl groups.

The drawings diagrammatically illustrate the superior bend-set properties of vulcanized organopolysiloxane rubber of the invention, as compared with the highest quality commercially available products.

In the drawings:

FIG. 1 graphically illustrates the form of the specimen used in the test experiment;

FIG. 2 shows the test specimen reversely bent 180° and in compressed condition;

FIG. 3 illustrates the method of measuring the bend set of the specimen at any given time period;

FIG. 4 graphically illustrates a comparison of the bend set on three of the best-known commercially available silicone rubbers with the bend set of the improved product five seconds after release; and FIG. 5 is a view similar to FIG. 4 but illustrating the bend set in the several specimens after a ten-minute period.

This bend-set test consists of preparing specimens in strip form one inch wide, three inches long, and of 0.075 inch thick. As shown in FIG. 2, the test strip has been bent 180° from normal on an appropriate surface, to which one end of the strip is attached, and compressed with a 5-pound weight which is allowed to remain on the specimen for a period of ten minutes. At the expiration of the ten-minute period the weight is removed and the angle between the return bend of the strip and the supporting surface measured periodically thereafter and expressed either as percent or in degrees of set.

The rapid recovery of a specimen conclusively demonstrates that the rubber possesses ideal elasticity and will function most efficiently as seals, gaskets and other specialized applications.

All four types subjected to the experiment have excellent physical strength, low-temperature flexibility and high-temperature stability. Each specimen was conditioned according to the manufacturer's suggestion for best performance. Specimens A, B and D passed AMS (Aeronautical Material Specification, Society of Automotive Engineers) specification No. 3345, while specimens B and D passed in addition BMS specification (Boeing Airplane Company Material Specification) No. 1—22. Specimen C, although possessing superior properties as a silicone rubber, did not meet these high specifications.

The physical properties of the specimens are as follows:

| Sample | A | B | C | D |
| --- | --- | --- | --- | --- |
| Hardness, Shore A | 45 | 55 | 68 | 55 |
| Tensile, p.s.i. | 1,420 | 1,540 | 1,331 | 1,550 |
| Elongation, percent | 575 | 550 | 430 | 550 |
| Tear p./i. | 230 | 225 | 151 | 263 |
| Bend set after 5 sec., percent | 16.7 | 26.7 | 9.45 | 2.2 |
| Bend set after 10 min., percent | 5.6 | 16.7 | 6.1 | 0 |

In carrying out the experiment, three specimens of the highest grade commercially available silicone rubber are compared with the product of the invention. As illustrated, after a 5-second period the commercial specimen A had a bend set of 30°, B a bend set of 48°, and C a bend set of 17°. In comparison the improved organopolysiloxane rubber of the invention, indicated as D, had a bend set of only 2.2% at the expiration of the 5-second period.

As shown in FIG. 5, after a 10-minute period, commercially available specimen A had a bend set of 10°, specimen B a bend set of 30°, and specimen C a bend set of 11°. At the termination of this period the product of the invention had returned completely to normal with a bend set of 0°.

The following examples demonstrate the commercial adaptability and advantages of the new process and product.

*Example 1*

20.0 lbs. of methylphenylvinyl polysiloxane (commercially available from General Electric Company as GE81635 silicone gum) and 1.85 lbs. (9.25 parts) of diphenylsilanediol were mixed on a 60-inch long two-roll rubber mill. When the diphenylsilanediol was dispersed thoroughly in the gum, 10.6 lbs. (53 parts) of fine silica (available from G. Cabot Co. as Cab-O-Sil 2491) was added together with a 50% methanolic solution of 0.6 lb. (3 parts) of triethylamine. The rolls were water cooled, and the temperature of the mix was 125° F. or below. In approximately 12 minutes of total milling time the batch was almost clear and very soft, indicating essentially complete dispersion of the filler. The batch was sheeted off the mill approximately 0.125 inch thick and placed in a hot air circulating oven. The temperature of the oven was brought up to 480° F. (this took 3 hours) and held at 480° for 70 minutes. After this time the batch was removed from the oven and cooled to room temperature.

The cold (75° F.) batch was placed on a 60-inch long two-roll water-cooled rubber mill and remilled. After about 10 minutes of milling time, the batch became very smooth and soft and almost transparent. To improve the extrusion characteristics, 1 lb. (5 parts) of Neo-Novacite (ground quartz available from Malvern Minerals), was added and mixed well. So prepared, the batch was soft and could be extruded, calendered or press molded. It could be used as a solvent dispersion for dip-coating application, or stored for a long period of time without essential changes in physical properties of the vulcanized rubber.

In this example the batch was press molded (10 minutes at 260° F.) after addition and dispersion of 0.16 lb. (0.8 part) of benzoyl peroxide in a 50% silicone oil paste.

The properties of a molded sheet were as follows:

Hardness, Shore A _____ 43
Tensile, p.s.i. _____ 1660
Elongation, percent _____ 675
Tear strength, p./i. _____ 272

This material may be used without additional postcure for many applications due to the unusually high state of the cure, especially evident in low property loss after 70 hours heat aging at 400° F. The changes of properties after aging were:

Hardness, Shore A _____ +9
Tensile, percent _____ −6
Elongation, percent _____ −32

To further improve the physical properties the rubber was conditioned between 1 and 16 hours at 400°–480° F. Such conditioned rubber has extremely good heat resistance, low compression set, and unusual elasticity shown by a very low tension and bend set.

The physical properties of the product after conditioning for 3 hours at 400° F. were:

Hardness, Shore A _____ 51
Tensile, p.s.i. _____ 1850
Elongation, percent _____ 550
Tear strength, p./i. _____ 344
Compression set, 70 hrs. at 212° F., percent _____ 12.5
Compression set, 70 hrs. at 300° F., percent _____ 32

The vulcanized product represents a substantial improvement over the past art due to its unusually high physical strength, elasticity, low-temperature flexibility and high-temperature resistance. For example, the above sample is flexible at −120° F. and shows no essential changes in properties after being subjected to heat at 212° F. for 70 hours, and shows very little change after 70 hours at 400° F.:

Hardness, Shore A _____ +2
Tensile strength, percent _____ −8
Elongation, percent _____ −11
Tear strength, percent _____ −15

This sample after 70 hours at 480° F. had a Shore A hardness of 61 points and tear strength above 160 pounds/inch. It was found to be serviceable after 48 hours' exposure at 550° F. The vulcanized products also pass all requirements of industrial specifications for high-strength silicone rubber, as for instance aircraft specifications BMS–1–22 and AMS 3345.

*Example 1A*

This example demonstrates excellent physical properties and heat stability of composition prepared by the method described in Example 1, but containing Santocel CS silica (product of Monsanto Chemical Co.). The recipe was:

| | Parts |
|---|---|
| Methylphenylvinyl polysiloxane | 100 |
| Diphenylsilanediol | 8 |
| Triethylamine | 3 |
| Santocel CS | 50 |
| Preheat 70 minutes at 480° F. | |
| Benzoyl peroxide | 0.5 |

The properties of the vulcanized sample were:

| Cure | Shore A Hardness | Tensile Strength, p.s.i. | Elongation, percent | Tear Strength, p./i. |
|---|---|---|---|---|
| 10 min. at 260° F. | 43 | 1,600 | 690 | |
| 3 hours at 400° F. | 48 | 1,900 | 625 | 305 |
| 3 hours at 400° F. plus 24 hours at 480° F. | 54 | 1,500 | 440 | 210 |

*Example 2*

Similar preparations were made for extrusion and hot-air vulcanization. The samples were extruded in the form of a 1-inch diameter tube of 0.075 inch wall thickness and passed through a hot oven at various speeds and temperatures. The retention of form and dimensions was excellent, and vulcanization could be effected very rapidly. At temperatures of 300° F. to 600° F. and with a residence time in the oven between 30 seconds and 1 hour, the average physical properties were:

Hardness, Shore A _____ 38–48
Tensile strength, p.s.i. _____ 1450–1700
Elongation, percent _____ 650–500
Tear, p./i. _____ 250–350

The compression set, elasticity, aging and other characteristics are similar to press-formed and oven-cured samples.

Similar results were obtained when the diphenylsilanediol was substituted by triphenylsilanol and other curing catalysts than benzoyl peroxide were used. Dicumylperoxide, 2,4-dichloro benzoyl peroxide, ditertiarybutyl peroxide and others were found to be equally effective.

In the formulation shown in this example, triethylamine may be substituted by other amines such as mono-, di- or polyamines or neutralized amines. Alcohol and other solvents may be used if desired.

In a series of formulations it was found that trimethylamine, hexamethylene diamine, triethanol amine, methylamine, hexamethylene diamine carbamate produced similar results to those shown above.

*Example 3*

A similar procedure as described in detail in Example 1 was used, but with a modified recipe, to prepare soft but strong silicone rubber products with a hardness in the range of Shore A 25 to 30.

It is well known that the preparation of low-hardness silicone rubber compounds with moderate strength (about 800 p.s.i.) is extremely difficult. (Dow Corning Corp. and General Electric Co. Silicone Rubber Compounding Notebooks). The suggested methods are to use small quantities of reinforcing fillers or plasticizing additives. In either case such compounds have low physical properties, poor heat stability and poor elasticity.

In accordance with the invention the recipe for a soft, high-strength compound was as follows:

| | Parts |
|---|---|
| Methylphenylvinyl polysiloxane | 100 |
| Diphenylsilanediol | 8.5 |
| Triethylamine | 4.0 |
| Cab-O-Sil 2491 | 30.0 |

The compound was preheated 70 minutes at 480° F., remilled and mixed with 0.3 part of benzoyl peroxide. The composition was press molded 10 minutes at 260° F., then conditioned 3 hours at 400° F. The physical properties compared very favorably with the best commercially available low-hardness compounds. The properties are shown below. A is the commercial compound, B is a compound prepared from materials and methods shown above according to the invention.

|  | A | B |
|---|---|---|
| Hardness, Shore A | 34 | 28 |
| Tensile strength, p.s.i | 1,180 | 1,340 |
| Elongation, percent | 925 | 835 |
| Tear, p./i | 115 | 215 |
| Aged 24 hours at 450° F.: |  |  |
| Hardness, Shore A | 45(+11) | 30(+2) |
| Tensile, p.s.i | 1,040(−12%) | 1,220(−8.9%) |
| Elongation, percent | 750(−19%) | 790(−5.4%) |
| Tear, p./i | No change | 210(−2%) |

Example 4

Samples of silicone rubber prepared as described in Example 1 were tested to determine elasticity, and for comparison with commercial high-strength silicone rubbers. The method used is the determination of tension set (ASTM D 412–51T procedure):

The tension set is the measure of the residual extension which remains after a sample of rubber has been stretched for some period, then released and allowed to recover. This set is not permanent and decreases with the time of relaxation at the rate characteristic for a particular compound. For practical purposes, a fast and complete rate of recovery is most desirable, since this allows use of a structural part made from silicone rubber with the same cushioning effect, or sealing effect, and allows stressing the rubber part without deformation. Three commercially available high-strength silicone rubbers designed to meet the requirements of AMS 3345 specification, were designated as Manufacturer A, Manufacturer B and Manufacturer C. The high-strength silicone rubber was prepared as in Example 2 and designated HS. All were tested in accordance with ASTM D 412 51–T. Each sample was stretched 100% for 10 minutes, then the residual extension measured after 5 seconds and after 10 minutes and expressed as a percentage of the original length.

|  | 5 Seconds | 10 Minutes |
|---|---|---|
|  | Percent | Percent |
| Manufacturer A | 6.0 | 2.5 |
| Manufacturer B | 8.0 | 5.0 |
| Manufacturer C | 3.0 | 3.0 |
| HS | 1.5 | 0 |

These specimens are from the same stock and have the same designations as those shown in the drawings and described hereinabove.

Example 5

This example demonstrates that the addition of hydroxy organosilanes to mixtures of polysiloxane gums and fine silica in larger proportions than 2 parts per 100 parts of gum is beneficial. The vulcanized samples have improved physical properties (elongation, tensile, tear). The addition was made on the mill (two rolls) and standard rubber technique was used in preparation and molding. The materials were: methylphenylvinyl polysiloxane gum and fine silica filler known as Cab-O-Sil (marketed by G. Cabot Company) and a peroxide curing agent.

| Parts of Hydroxy Organosilane | Parts of Cab-O-Sil | Curing Agent | Cure | Properties ||| 
|---|---|---|---|---|---|---|
|  |  |  |  | Shore A | Tensile, p.s.i. | Elongation, percent |
| 20 TPS [1] | 38 | 1 pt. of BP.[3] | 30 Min. at 300° F. 1 hr. at 400° F. | 43 | 800 | 615 |
| 7 DPSD [2] | 45 | 1.25 pts. of BP. | 10 Min. at 270° F. 8 hrs. at 375° F. | 68 | 1,300 | 450 |
| Control 2 DPSD. | 40 | 0.65 pt. of BP. | 10 Min. at 270° F. 8 hrs. at 375° F. | 72 | 600 | 225 |

[1] TPS—triphenylsilanol.
[2] DPSD—diphenylsilanediol.
[3] BP—benzoyl peroxide.

Example 6

This example demonstrates the effect of preheat in the absence of added reagents, as described in the Kilbourne et al. Patent 2,709,161. The effect in this formulation shows that hardness is lower 15 points on Shore A, with no improvement in tensile strength.

Basic formulation:
  Methylphenylvinyl gum _____ 100
  DPSD _____ 2.0
  Cab-O-Sil 2491 _____ 30.0

Compound A was preheated 80 minutes at 480° F. then remilled and dicumyl peroxide curing agent added in proportion of 0.3 part per 100 of gum. Compound B was catalyzed with 0.3 part per 100 of gum of dicumyl peroxide and not preheated. Each compound was pressed 10 minutes at 340° F. and postcured 3 hours at 400° F.

After this the properties were:

|  | Shore A | Tensile, p.s.i. |
|---|---|---|
| Compound A | 54 | 1,020 |
| Compound B | 69 | 1,135 |

Example 7

This example shows that addition of amine and preheat even at low-level diphenylsilanediol produced superior physical properties when compared with a control compound containing no amine and not preheated. Furthermore, this example shows that various temperatures and times of preheat may be used as well as various quantities of an amine. The following was the base compound:

|  | Parts |
|---|---|
| Methylphenylvinyl gum | 100 |
| Diphenylsilanediol | 2 |
| Cab-O-Sil 2491 | 30 |

The curing catalyst was added after preheat in quantities 0.3 to 0.6 part per hundred of the gum. Time and temperature of preheat are shown in the table. Physical properties of each compound are shown after each compound was press cured at 340° F. for 10 minutes and postcured 3 hours at 400° F.

| Compound No. | 1 | 2 | 3 | 4 | 5 | 6 | 7 |
|---|---|---|---|---|---|---|---|
| Time of preheat | 20 | 20 | 20 | 10 | 10 | 40 | none |
| Temperature of preheat ° F. | 480 | 200 | 300 | 480 | 480 | 300 | none |
| Soluble amine (triethylamine) | 4 | 4 | 4 | 4 | 4 | 4 | none |
| Physical Properties: |  |  |  |  |  |  |  |
| Shore A | 45 | 50 | 51 | 48 | 43 | 46 | 69 |
| Tensile | 1,090 | 760 | 1,100 | 1,005 | 1,075 | 1,120 | 1,135 |
| Elongation | 620 | 600 | 600 | 590 | 605 | 565 | 390 |

Also, comparing the above results with those outlined in Example 6, it is observed that preheating for only 20 minutes in the presence of amine resulted in an outstanding improvement in the hardness and elongation characteristics of the product.

*Example 8*

This example shows the effect of time of preheat, indicating that properties in some formulations are improved by longer heating.

Basic compound:
| | |
|---|---|
| MPV gum | 100 |
| DPSD | 8 |
| Triethylamine | 3 |
| Cab-O-Sil 2491 | 48 |

Sample A was preheated 60 minutes at 480° F., Sample B 120 minutes at 480° F. Each compound was remilled, catalyzed with 0.375 part of benzoyl peroxide per 100 parts of gum, and press molded 10 minutes at 260° F.

The physical properties were:

| | Shore A | Tensile | Elongation | Tear |
|---|---|---|---|---|
| Compound A | 44 | 1,000 | 510 | 165 |
| Compound B | 44 | 1,270 | 500 | 185 |

*Example 9*

This example shows that thickness of the preheated, premixed compound has an effect on the physical properties. The following compound was mixed, preheated, and prepared in thicknesses of A—⅛", B—¼" and C—½" thick:

| | |
|---|---|
| MPV gum | 100 |
| DPSD | 6.5 |
| Triethylamine | 3.0 |
| Cab-O-Sil 2491 | 40.0 |

Preheat 40 minutes at 480° F.

Each sample was remilled, compounded with 0.32 part of benzoyl peroxide and press cured 10 minutes at 270° F. and postcured 3 hours at 400° F. The physical properties were as follows:

| | A—⅛ | B—¼ | C—½ |
|---|---|---|---|
| Shore A | 43 | 43 | 37 |
| Tensile | 1,620 | 700 | 375 |
| Elongation | 620 | 575 | 450 |
| Tear | 285 | 95 | 60 |

*Example 10*

This example demonstrates that the process and materials claimed in this invention are capable of producing very strong but resilient vulcanizates from different types of silica fillers. The results shown below demonstrate a striking improvement of physical properties of vulcanizates containing the same amount of filler and curing agent but prepared according to the present invention. It can be seen also that the resistance to dry heat is very good.

In this example silicas particularly known for best reinforcing properties of silicone rubber are used. The following commercially available silicas were investigated: (a) Fume process silicas (obtainable by burning silicon tetrachloride in hydrogen-oxygen flame) Cab-O-Sil 2491 and Cab-O-Sil (both produced by Godfrey L. Cabot, Inc.); (b) wet process silicas (obtainable from aqueous solution of sodium silicate) Hi-Sil X303 (produced by Columbia Southern Co.) and Santocel CS (produced by Monsanto Co.).

The basic formulation was:

| | Parts |
|---|---|
| Methylphenylvinyl polysiloxane | 100 |
| Silica filler | 45 |
| 2,4-dichlorobenzoyl peroxide (added in form of 50% silicone oil paste) | 0.75 |

All compounds A were prepared by procedures described in Example 1 (adding 8 parts of diphenylsilanediol to 3 parts of triethylamine, and preheating 60 minutes at 480° F.). All compounds B were mixed without other ingredients and not preheated, and thus they represent control compounds prepared by commercially known procedures. Each compound was press molded 10 minutes at 260° F. The properties of pressed compounds A are very good and they change very little during postcure 3 hours at 400° F., and, again, they show small change of properties after 70 hours at 400° F. Compounds B have poor tensile and tear and elongation when compared with compounds A. A large percent loss of initial (press) elongation after 3 hours at 400° F. indicates very poor heat stability. It is quite evident that in order to be serviceable at elevated temperatures they must be conditioned before use. The difference in hardness between A and B compounds shows further the radical improvement and benefits of the invention.

| Filler used | Cab-O-Sil 2491 | | Cab-O-Sil | | Hi-Sil X303 | | Santocel CS | |
|---|---|---|---|---|---|---|---|---|
| Compound | A | B | A | B | A | B | A | B |
| Physical properties, press molded 10 minutes at 260° F.: | | | | | | | | |
| Hardness Shore A | 35 | 64 | 35 | 65 | 38 | 58 | 33 | 65 |
| Tensile, p.s.i. | 1,585 | 950 | 1,355 | 807 | 1,160 | 490 | 1,065 | 440 |
| Elongation, percent | 695 | 470 | 712 | 427 | 800 | 428 | 1,000 | 562 |
| Physical properties, 3 hours at 400° F.: | | | | | | | | |
| Hardness Shore A | 39 | 75 | 38 | 73 | 40 | 70 | 37 | 75 |
| Tensile, p.s.i. | 1,565 | 700 | 1,260 | 710 | 1,000 | 355 | 1,110 | 425 |
| Elongation, percent | 635 | 280 | 675 | 275 | 635 | 200 | 925 | 210 |
| Tear, p./i. | 217 | 120 | 180 | 75 | 152 | 49 | 220 | 60 |
| Physical properties, 70 hours at 400° F.: | | | | | | | | |
| Hardness Shore A | 40 | 78 | 40 | 75 | 40 | 70 | 45 | 77 |
| Tensile, p.s.i. | 1,490 | 550 | 1,105 | 430 | 1,065 | 340 | 1,005 | 360 |
| Elongation, percent | 580 | 190 | 580 | 170 | 650 | 200 | 630 | 185 |
| Tear, p./i. | 225 | 95 | 187 | 87 | 168 | 54 | 175 | 71 |

*Example 11*

The procedure described in Example 1 was used in preparing compounds containing, instead of methylphenylvinyl gum, other types of gums, including dimethyl, methylphenyl, methylvinyl, and fluoro-substituted gums. In each case an improvement of physical properties was observed, especially evident in lowering the hardness value, increasing tear strength twofold and more, improving tensile to over 1000 p.s.i. in each case, and improving elongation. This procedure is effective even with already mixed compounds available commercially on the market, for example, Dow Corning's fuel-resistant silicone rubber compound sold under the name LS–53U. (This compound employs a fluoro-containing polysiloxane as the essential fuel-resistant polymer.) To 100 parts of this compound 6 parts of diphenylsilanediol, 2 parts of triethylamine and 10 parts of Cab-O-Sil 2491 were added, mixed very carefully on the cold mill, preheated 70 minutes at 480° F., remilled and catalyzed with 0.5 part of benzoyl peroxide (Compound A). Two control compounds were prepared: B—LS–53U (catalyzed with 0.75 benzoyl peroxide—optimum for best properties, suggested by the manufacturer), and C—same as B, but 10 parts per 100 of Cab-O-Sil 2491 was added. Each compound was press molded 10 minutes at 260° F., then postcured 3 hours at 400° F.

|  | A | B | C |
|---|---|---|---|
| Hardness, Shore A | 59 | 60 | 81 |
| Tensile, p.s.i. | 1,130 | 890 | 950 |
| Elongation, percent | 465 | 180 | 130 |
| Tear, p./i. | 225 | 65 | 80 |

*Example 12*

This example shows the beneficial effect of DPSD and preheat and combined effect of DPSD, TEA and preheat.

The following compounds were prepared using standard rubber technique. Compound A contained no DPSD or amine and was not preheated, Compound B contained 4 parts of DPSD and was not preheated, Compound C contained 4 parts DPSD, was preheated 60 minutes at 480° F., and Compound D was preheated in a similar manner and contained 4 parts of DPSD and 4 parts of triethylamine. Each compound was catalyzed with 0.3 part of benzoyl peroxide and pressed 10 minutes at 270° F. and postcured 3 hours at 400° F.

Base recipe:

| | Parts |
|---|---|
| Methylphenylvinyl gum | 100 |
| Cab-O-Sil 2491 | 37.5 |

Physical properties:

| Compound | A | B | C | D |
|---|---|---|---|---|
| Hardness, Shore A | 63 | 54 | 49 | 47 |
| Tensile, p.s.i. | 950 | 1,050 | 1,220 | 1,350 |
| Elongation, percent | 215 | 380 | 420 | 475 |
| Tear, p./i. | 90 | 95 | 105 | 185 |

*Example 13*

This example demonstrates that the preheating of a mixture of polysiloxane gum and fine silica filler is not sufficient to obtain any significant improvement in the final vulcanizates. Also this example shows that so-called "hot milling" does not improve physical properties of polysiloxane vulcanizates.

Both heat treatment and hot milling are described by A. M. Gessler and John Rehner, Jr. in Rubber Age, September 1955 and October 1955, in the paper "The Reinforcement of Butyl and Other Synthetic Rubbers with Silica Pigments." Silicone rubbers were not mentioned in this paper and the results of experiments shown below indicate that hot milling, although beneficial for butyl rubber, is rather detrimental for silicone rubber. Also introduction of ammonia atmosphere on fine silica and prior mixing did not contribute to the improvement of physical properties.

*Compound A.*—Methylphenylvinyl polysiloxane, 100 parts, were combined (but not thoroughly milled) with 30 parts of Cab-O-Sil 2491, heated 2 hours at 300° F. and remilled, then 2 parts of diphenylsilanediol and 0.65 part of 2,4-dichlorobenzoyl peroxide added. The mixture was pressed 10 minutes at 270° F.

*Compound B.*—The same quantities, procedure and materials were used as in Compound A, but Cab-O-Sil silica was treated with gaseous ammonia for 48 hours at room temperature in a closed vessel.

*Compound C.*—The same quantities and materials as in Compound A were used, but polysiloxane and silica filler were milled on a hot mill 260°–300° F. for 30 minutes.

*Compound D.*—The same quantities and materials as in Compound A were combined on the cold mill, and milled for approximately 15 minutes, then the rubber was press cured 10 minutes at 260° F.

*Compound E.*—(Compound D from Example 12 by the invented process).

The following physical properties were obtained from these samples prepared in the indicated manner:

| Sample | A | B | C | D | E |
|---|---|---|---|---|---|
| Hardness, Shore A | 31 | 34 | 44 | 61 | 47 |
| Tensile, p.s.i. | 430 | 395 | 650 | 950 | 1,350 |
| Elongation, percent | 500 | 400 | 380 | 410 | 475 |
| Tear, p./i. | 50 | 30 | 90 | 95 | 185 |

It will be apparent from the foregoing examples that any type of silica filler and polysiloxane gum can be used to produce silicone rubber vulcanizates having exceptionally superior physical properties. In addition, the process allows the incorporation of larger amounts of filler, thereby rendering feasible substantial economies in the formulation.

What we claim is:

1. A method for the preparation of organopolysiloxane rubber which comprises mixing together in absence of heat 100 parts of an organopolysiloxane rubber of the formula

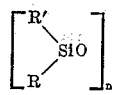

in which R and R' are selected from the class consisting of methyl and ethyl groups, halogen and nitrile substituted alkyl groups containing from 1 to 4 carbon atoms, phenyl, halogenated phenyl, vinyl and cyclohexenyl groups and $n$ is an integer denoting the degree of polymerization, 5 to 100 parts of finely divided silica filler, 1 to 20 parts of an organic amine and 1 to 20 parts of a hydroxy organosilane selected from the class consisting of diphenylsilanediol and triphenylsilanol, heating the mixture at a temperature of from 100 to 600° F. in the absence of curing agents for a period of from about 1 minute to 96 hours under conditions wherein the mixture is essentially uncured, cooling and remilling the mixture, adding a curing agent to the composition and finally converting the same to a cured organopolysiloxane rubber.

2. A cured organopolysiloxane rubber when prepared by the method of claim 1.

3. The method defined in claim 1, wherein the heating period referred to is from about 1 minute to 72 hours.

4. A method for the preparation of organopolysiloxane rubber which comprises mixing together in absence of heat 100 parts of an organopolysiloxane rubber of the formula

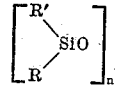

in which R and R' are selected from the class consisting of methyl and ethyl groups, halogen and nitrile substituted alkyl groups containing from 1 to 4 carbon atoms, phenyl, halogenated phenyl, vinyl and cyclohexenyl groups and $n$ is an integer denoting the degree of polymerization, 5 to 100 parts of finely divided silica filler, 1 to 20 parts of an organic amine and 1 to 20 parts of a hydroxy organosilane selected from the class consisting of diphenylsilanediol and triphenylsilanol, heating the mixture at a temperature of from 250 to 500° F. in the absence of curing agents for a time period of from 5 minutes to 10 hours under conditions wherein the mixture is essentially uncured, cooling and remilling the mixture, adding a curing agent to the composition and finally converting the same to a cured organopolysiloxane rubber.

5. A cured organopolysiloxane rubber when prepared by the method of claim 4.

6. The method set forth in claim 4, wherein the amount of amine employed is approximately 1 to 15 parts to each 100 parts of the organopolysiloxane.

7. The method of claim 4, wherein the hydroxy organosilane employed is diphenylsilanediol.

8. A cured organopolysiloxane rubber when prepared by the method of claim 7.

9. The method of claim 4 wherein the amine employed is triethylamine and the hydroxy organosilane employed is diphenylsilanediol.

10. A cured organopolysiloxane rubber as set forth in claim 1 wherein the curing agent is an organic peroxide.

References Cited in the file of this patent

UNITED STATES PATENTS

| | | |
|---|---|---|
| 2,610,167 | Te Grotenhuis | Sept. 9, 1952 |
| 2,709,161 | Kilbourne et al. | May 24, 1955 |
| 2,819,236 | Dickmann | Jan. 7, 1958 |
| 2,852,484 | New | Sept. 16, 1958 |
| 2,875,163 | Berridge | Feb. 24, 1959 |
| 2,875,172 | Caprino | Feb. 24, 1959 |
| 2,890,188 | Konkle et al. | June 9, 1959 |
| 2,938,010 | Bluestein | May 24, 1960 |